United States Patent
Verma et al.

(10) Patent No.: US 11,871,107 B2
(45) Date of Patent: Jan. 9, 2024

(54) AUTOMATIC CAMERA SELECTION

(71) Applicant: QUALCOMM Incorporated, San Diego, CA (US)

(72) Inventors: Nikhil Verma, Bangalore (IN); Vishnu Vardhan Kasilya Sudarsan, Bangalore (IN); Naga Chandan Babu Gudivada, Hyderabad (IN); Prakasha Nayak, Parkala (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/736,919

(22) Filed: May 4, 2022

(65) Prior Publication Data

US 2023/0362479 A1 Nov. 9, 2023

(51) Int. Cl.
*H04N 23/60* (2023.01)
*H04N 23/45* (2023.01)
*H04N 23/63* (2023.01)
*H04N 23/611* (2023.01)

(52) U.S. Cl.
CPC ............. *H04N 23/64* (2023.01); *H04N 23/45* (2023.01); *H04N 23/611* (2023.01); *H04N 23/63* (2023.01)

(58) Field of Classification Search
CPC ...... H04N 23/64; H04N 23/45; H04N 23/611; H04N 23/63
See application file for complete search history.

(56) References Cited

U.S. PATENT DOCUMENTS

| 11,005,582 B1* | 5/2021 | Anvari | H04W 4/70 |
| 2010/0027983 A1 | 2/2010 | Pickens et al. | |
| 2022/0179187 A1* | 6/2022 | Harfouche | G02B 21/368 |

FOREIGN PATENT DOCUMENTS

| CN | 113676658 A | 11/2021 |
| CN | 113747028 A | 12/2021 |

OTHER PUBLICATIONS

International Search Report and Written Opinion—PCT/US2023/066219—ISA/EPO—Aug. 8, 2023.

* cited by examiner

*Primary Examiner* — Yogesh K Aggarwal
(74) *Attorney, Agent, or Firm* — QUALCOMM Incorporated

(57) ABSTRACT

Systems and techniques are provided for selecting a camera from a plurality of cameras. For example, a process can include obtaining an image from a camera. In some cases, the process can include determining a depth of field (DOF) range associated with a scene captured in the image. In some aspects, the process can include comparing the DOF range associated with the scene captured in the image with one or more DOF ranges of respective cameras of a plurality of cameras. In some examples, the process can include determining a selected camera from the plurality of cameras based on comparing the DOF range associated with the scene captured in the image with respective one or more DOF ranges of each camera of the plurality of cameras.

26 Claims, 9 Drawing Sheets

AUTOMATIC CAMERA SELECTION

FIELD

The present disclosure generally relates to the capture of images, and more specifically to systems and techniques for selecting a camera from multiple available cameras.

BACKGROUND

Many devices and systems allow a scene to be captured by generating images (or frames) and/or video data (including multiple frames) of the scene. For example, a camera or a device including a camera can capture a sequence of images of a scene (e.g., a video of a scene). In some cases, the sequence of images can be processed for performing one or more functions, can be output for display, can be output for processing and/or consumption by other devices, among other uses.

Devices (e.g., mobile devices) and systems are increasingly leveraging specialized ultra-low power camera hardware for "always-on" (AON) camera use cases where a camera can remain on to continuously record while maintaining a lower power usage footprint. The AON camera can capture images or video of a scene prior to the user initiating an image or video capture. However, the overall power consumption of AON camera setups capturing images or video can nevertheless significantly reduce the battery life of mobile devices, which generally have a limited battery life. In some cases, AON camera setups can leverage low power camera hardware for reduced power consumption.

BRIEF SUMMARY

Disclosed are systems, apparatuses, methods, and computer-readable media for selecting a camera from a plurality of cameras. According to at least one example, a method is provided for selecting a camera from a plurality of cameras. The method includes: obtaining an image from a camera; determining a depth of field (DOF) range associated with a scene captured in the image; comparing the DOF range associated with the scene captured in the image with one or more DOF ranges of respective cameras of a plurality of cameras; and determining a selected camera from the plurality of cameras based on comparing the DOF range associated with the scene captured in the image with respective one or more DOF ranges of each camera of the plurality of cameras.

In another example, an apparatus for selecting a camera from a plurality of cameras is provided that includes at least one memory and at least one processor coupled to the at least one memory. The at least one processor is configured to: obtain an image from a camera; determine a depth of field (DOF) range associated with a scene captured in the image; compare the DOF range associated with the scene captured in the image with one or more DOF ranges of respective cameras of a plurality of cameras; and determine a selected camera from the plurality of cameras based on comparing the DOF range associated with the scene captured in the image with respective one or more DOF ranges of each camera of the plurality of cameras.

In another example, a non-transitory computer-readable medium is provided that has stored thereon instructions that, when executed by one or more processors, cause the one or more processors to: obtain an image from a camera; determine a depth of field (DOF) range associated with a scene captured in the image; compare the DOF range associated with the scene captured in the image with one or more DOF ranges of respective cameras of a plurality of cameras; and determine a selected camera from the plurality of cameras based on comparing the DOF range associated with the scene captured in the image with respective one or more DOF ranges of each camera of the plurality of cameras.

In another example, an apparatus for selecting a camera from a plurality of cameras is provided. The apparatus includes: means for obtaining an image from a camera; means for determining a depth of field (DOF) range associated with a scene captured in the image; means for comparing the DOF range associated with the scene captured in the image with one or more DOF ranges of respective cameras of a plurality of cameras; and means for determining a selected camera from the plurality of cameras based on comparing the DOF range associated with the scene captured in the image with respective one or more DOF ranges of each camera of the plurality of cameras.

In some aspects, one or more of the apparatuses described above is or is part of a vehicle (e.g., a computing device of a vehicle), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatuses, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
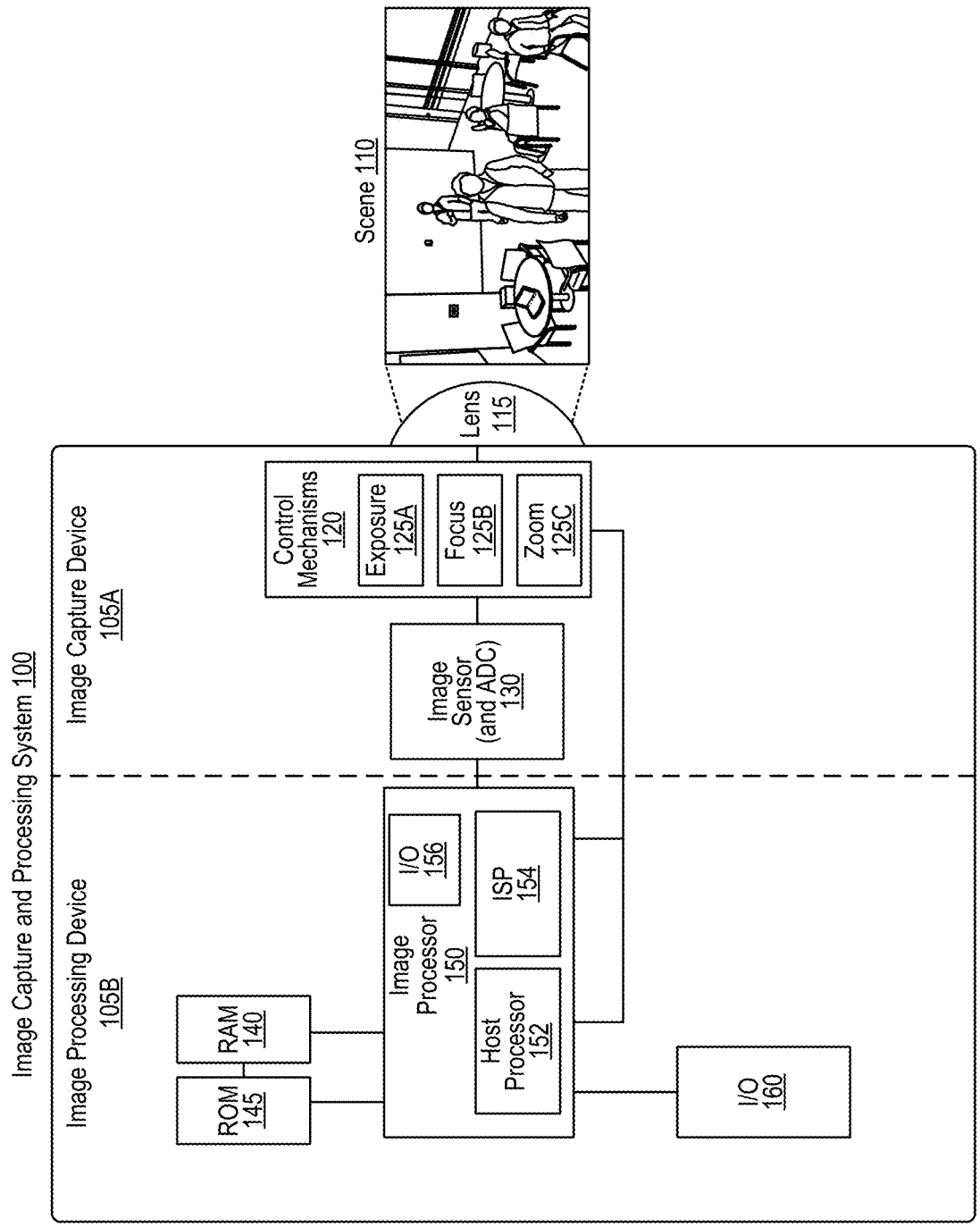
FIG. 1 is a block diagram illustrating an architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Systems and techniques are described herein for selecting a camera from multiple available cameras. In some examples, an image capture system can implement a lower-power or "always-on" (AON) camera that persistently or periodically operates to automatically detect certain objects in an environment. For instance, an image capture system that can capture preliminary images with an AON camera can be useful in situations where the image capture system includes a selection of multiple cameras for capturing images of a scene. For example, a device may include a telephoto camera, a wide-angle camera, and/or additional cameras. The device may automatically select a camera to be active from the available cameras. In some cases, the selection can be based on a determined depth of field (DOF) range associated with the scene and one or more DOF ranges associated with each of the multiple cameras. In one illustrative example, the DOF for the scene can be determined based on object recognition and depth estimation and/or measurement. For instance, the determined DOF for the scene can be selected such that both the nearest and farthest recognized subject (e.g., a person, friend, pet, object, landmark, and/or any other subject of interest) will be captured with an acceptable focus. In some cases, the selection can be based on a field of view (FOV) associated with the scene. For example, a camera from the available cameras may be selected based on having a FOV sufficiently large to capture all recognized subjects.

While examples are described herein with reference to an AON camera, such aspects can be applied to any camera or image sensor that operates in a low-power mode. In some cases, the AON camera can leverage low power camera hardware for reduced power consumption. In some cases, the AON camera can operate with low power settings and/or perform different or fewer image processing steps for reduced power consumption. The amount of power consumed by the AON camera to determine which camera to select from the multiple available cameras can be less than the power required to power on each individual camera and capture an image to determine which camera is associated with a DOF range that most closely matches the DOF for the scene. In some cases, after a user initiates a video and/or image capture, a selected camera from the multiple cameras can capture a still image or begin capturing video frames. The selected camera can utilize higher power camera hardware and/or can operate with higher power settings and/or different or more image processing steps as compared to an AON or other low-power camera.

As used herein, DOF range refers to a near distance of acceptable focus and a far distance of acceptable focus. A DOF range can have a corresponding DOF corresponding to the distance between the near distance of acceptable focus and the far distance of acceptable focus. In some cases, an individual camera (e.g., one or more cameras of the multiple available cameras) can be associated with a single DOF range. For example, a camera with a fixed aperture and fixed lens position may have fixed near and far distances of acceptable focus. However, in some cases, an individual camera may be associated with multiple DOF ranges. In one illustrative example, an individual camera can include a variable aperture. In some cases, as the aperture of the variable aperture is varied, the DOF of the camera, including the near depth of acceptable focus and/or far distance of acceptable focus, can also vary. In some examples, DOF ranges for a camera can be expressed with a mathematical relationship (e.g., a function) that can be used to calculate DOF ranges across a range of camera settings (e.g., aperture, lens position, etc.).

In one illustrative example, a single camera or sensor can be configured to operate with different operating modes (e.g., a low power AON mode and a non-AON mode). References to "AON operation" herein can be understood to include capturing images and/or frames (e.g., video frames) with one or more AON cameras and/or operating one or more cameras in an AON mode. In the present disclosure, images captured during AON operation are sometimes referred to as low power images. Similarly, references to "standard operation" can be understood to include capturing images with one or more non-AON cameras and/or one or more cameras operating in a non-AON mode. In addition, non-AON cameras or sensors and/or cameras or sensors operating in a non-AON mode can sometimes be referred to as one or more "main cameras" or "main camera sensors". In the present disclosure, images captured during standard camera operation are sometimes referred to as high power images. The systems and techniques will be described herein as being performed with respect to still images. However, it will be understood that the systems and techniques can operate using any sequence of images or frames, such as consecutively captured still images, video, or the like. It should be understood that while specific examples of the disclosure are discussed in terms of an AON camera (or AON camera sensor) and a main camera (or main camera sensor), the systems and techniques described herein can be applied to many different camera or sensor configurations without departing from the scope of the present disclosure.

A user can initiate an image and/or video capture by, for example, pressing a capture or record button (also referred to as a shutter button in some cases), performing a gesture, and/or any other method of providing a capture input. In some cases, prior to pressing the capture or record button, a user may perform actions that can be recognized by a device as indicating that the user may be preparing to capture an image and/or video. In some cases, the systems and techniques can recognize that a capture is likely to occur (e.g., once the user presses the capture or record button) and preemptively begin a process of selecting a camera from the multiple cameras to capture an image of a scene detected in a preliminary image by the AON camera.

In some cases, AON operation can include capturing images at a low resolution (e.g., VGA resolution of 640 pixels×480 pixels, WVGA resolution of 800 pixels×480 pixels, or the like). In some cases, standard operation can include capturing images at a higher resolution than AON operation (e.g., 720p, 1080i, 1080p, 4K, 8K or the like). Capturing and processing images at the lower resolution during AON operation can consume less power than capturing and processing video data at the higher resolution during standard operation. For example, the amount of power required to read the image(s) captured by the image capture system can increase as the number of pixels read out increases. In addition, the amount of power required for image post-processing of the captured image data can also increase as the number of pixels in the images increase. In some aspects, in the case of selecting a camera from multiple available cameras, the power savings can increase as the number of cameras available for selection increases. For example, power savings can be calculated relative to the power consumption associated with turning on each available camera, capturing an image, and analyzing the captured images from each camera to determine a preferred camera for capturing a scene.

While specific example configurations are described herein for selecting a camera from multiple available cameras, the systems and techniques described herein can be used to select between multiple cameras without departing from the scope of the present disclosure. For example, the systems and techniques can be used to select between multiple DOF ranges of a single camera. In such an example, the single camera may include a variable aperture, a movable lens, any other DOF adjustment, and/or any combination thereof.

Various aspects of the techniques described herein will be discussed below with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the image capture and processing system 100 faces a scene 110 and receives light from the scene 110. The lens 115 bends the light toward the image sensor 130. The light received by the lens 115 passes through an aperture controlled by one or more control mechanisms 120 and is received by the image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, DOF, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 910 discussed with respect to the computing system 900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using a MIPI port.

The image processor 150 may perform a number of tasks, such as de-mosaicing, color space conversion, image downsampling, pixel interpolation, automatic exposure (AE) control, automatic gain control (AGC), CDAF, PDAF, automatic white balance, merging of images to form an HDR image, image recognition, object recognition, feature recognition, receipt of inputs, managing outputs, managing memory, or some combination thereof. The image processor 150 may store images and/or processed images in random access memory (RAM) 140/925, read-only memory (ROM) 145/920, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 935, any other input devices 945, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral devices and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral devices and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
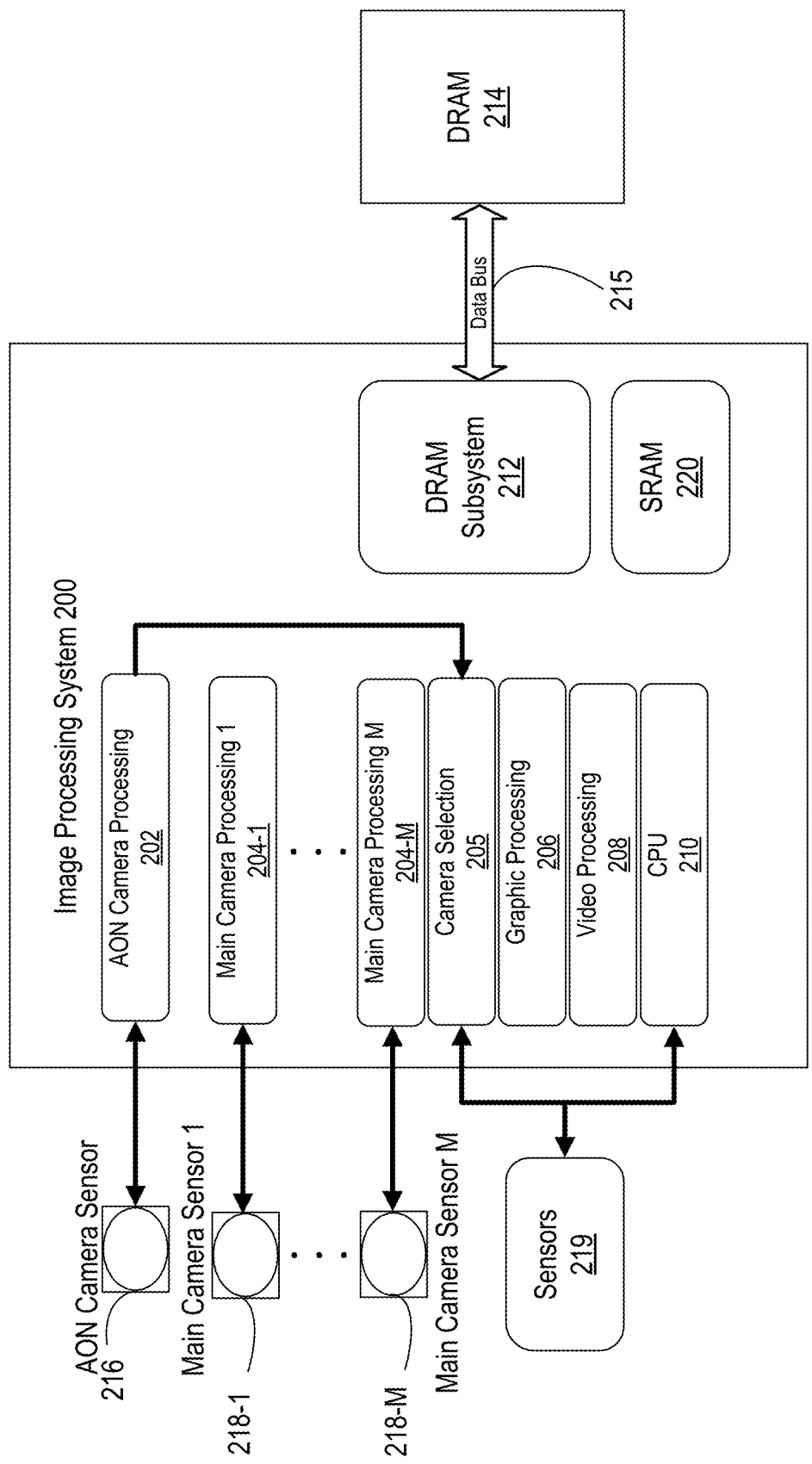
FIG. 2 is a block diagram illustrating an example image processing system, in accordance with some examples.

In some examples, the extended reality (XR) system 200 of FIG. 2 can include the image capture and processing system 100, the image capture device 105A, the image processing device 105B, or a combination thereof.

FIG. 2 illustrates an example block diagram of an image processing system 200. In some cases, the image processing system 200 can include, or can be included in, an image capture and processing system 100, an image capture device 105A, an image processing device 105B, portions thereof, or any combination thereof. In the illustrative example of FIG. 2, the image processing system 200 includes AON camera processing subsystem 202, multiple main camera processing subsystems 204-1 through 204-M (collectively referred to herein as main camera processing subsystems 204), a graphic processing subsystem 206, a video processing subsystem 208, a central processing unit (CPU) 210, a DRAM subsystem 212, an AON camera sensor 216, multiple main camera sensors 218-1 through 218-M (collectively referred to herein as main camera sensors 218), one or more sensors 219, and an SRAM 220. The value M can be an integer corresponding to a total number of main camera processing subsystems 204 and/or main camera sensors 218.

In some cases, the AON camera sensor 216 and/or the main camera sensors 218 can provide different DOF ranges for capturing images based on associated optical characteristics.

Figure 3A:
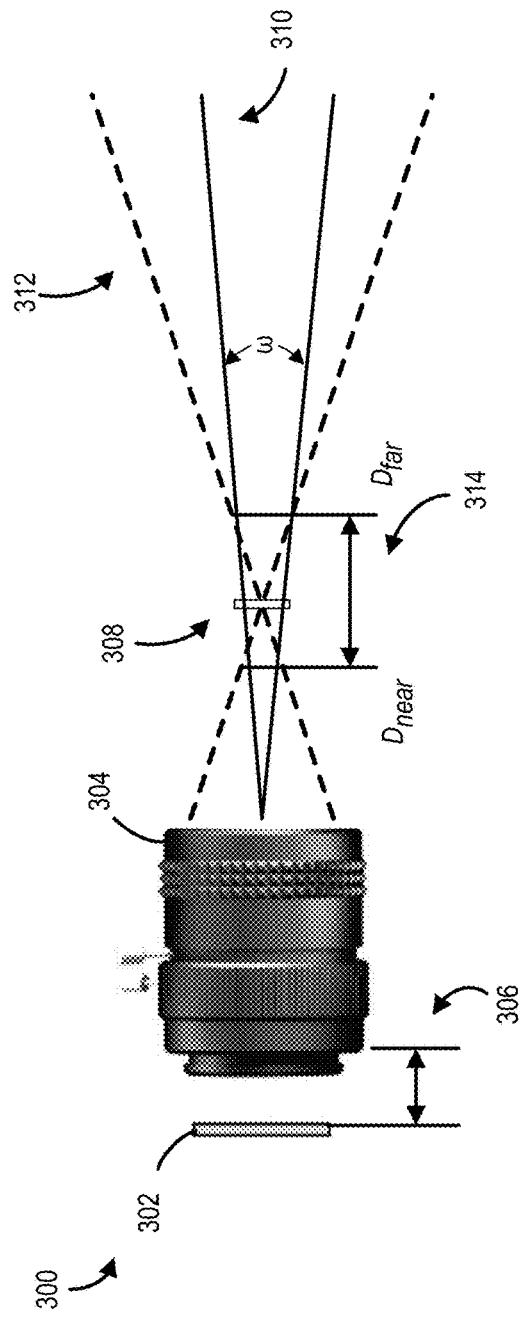
FIG. 3A and FIG. 3B are diagrams illustrating relationships between camera configurations and depth of field (DOF) range, in accordance with some examples.
Figure 3B:
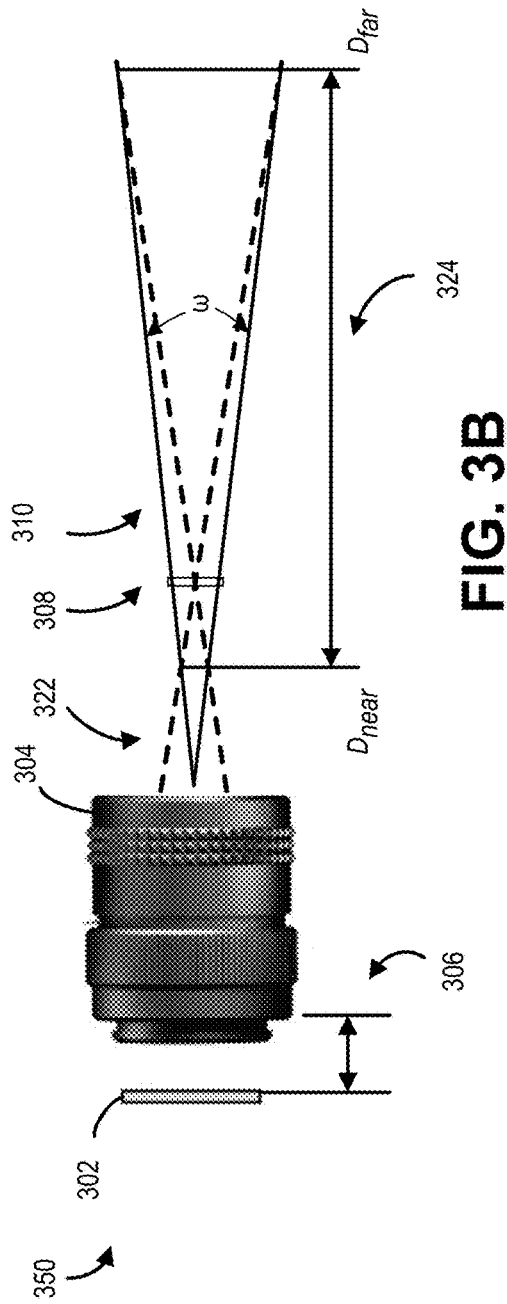

Referring to FIGS. 3A and 3B, illustrative examples of DOF ranges associated with different camera configurations are provided. In the illustration of FIG. 3A, a first configuration 300 and corresponding DOF range 314 for a camera are shown. In the illustrated example of FIG. 3A, the camera includes a lens assembly 304 and an image sensor 302. As illustrated, the image sensor 302 can be spaced from the lens assembly by a distance 306. In some cases, the distance 306 be determined by positioning of the lens assembly 304 and the sensor 302 in the housing of an electronic device (not shown). The camera configuration 300 can have a corresponding focus distance 308 and angle of view ω and corresponding FOV indicated by diverging lines 310 beginning at the center of lens assembly 304. The lens assembly 304 can include an aperture, and the size of the aperture is indicated by the light cone 312. The DOF range 314 of the first configuration 300 is shown extending between $D_{near}$ and $D_{far}$, where $D_{near}$ is the near distance of acceptable sharpness, $D_{far}$ is the far distance of acceptable focus for the first configuration 300. The near distance $D_{near}$ and far distance $D_{far}$ of acceptable focus can be determined based on characteristics of the optical system including the sensor 302 and the lens assembly 304 (e.g., one or more lenses, aperture, etc.) according to Equations (1)-(3) below.

$$H = \frac{f^2}{N*c} \quad (1)$$

$$D_{near} = \frac{s(H-f)}{H+s-2f} \quad (2)$$

$$D_{far} = \frac{s(H-f)}{H-s} \quad (3)$$

Where H is the hyperfocal distance in millimeter (mm), s is the focus distance 308, f is the focal length in mm, N is the f-number, and c is the circle of confusion in mm.

FIG. 3B illustrates a second configuration 350 where the aperture of lens assembly 304 has been reduced as indicated by the light cone 322. In the illustrated example of FIG. 3B, the image sensor 302, lens assembly 304, and corresponding lens to sensor distance 306, corresponding focus distance 308 and angle of view ω are the same as FIG. 3A. However, as a result of the reduction in aperture size (as indicated by the narrower light cone 322) relative to FIG. 3A, the resulting DOF range 324 is increased. As illustrated in FIG. 3B, $D_{near}$ of the DOF range 324 is nearer to the lens assembly 304 than $D_{near}$ of the DOF range 314 of FIG. 3A. In the illustrated example of FIG. 3B, $D_{far}$ of the DOF range 324 is farther away from the lens assembly 304 than $D_{far}$ of the DOF range 314 of FIG. 3A.

Returning to FIG. 2, in some implementations, the AON camera processing subsystem 202 can receive inputs from an AON camera sensor 216 and each main camera processing subsystem 204 can receive inputs from a corresponding main camera sensor 218. For example, main camera processing subsystem 204-1 is shown receiving inputs from main camera sensor 218-1 and main camera processing subsystem 204-M is shown receiving inputs from main camera sensor 218-M. The AON camera sensor 216 and the main camera sensors 218 can include any image and/or video sensors or capturing devices. In some cases, the AON camera sensor 216 and the main camera sensors 218 can be part of a multiple-camera assembly, such as a dual-camera assembly. In some examples, the AON camera sensor 216 and the main camera sensors 218 may include an image capture and processing system 100, an image capture device 105A, an image processing device 105B, or a combination thereof. In some implementations, the AON camera processing subsystem 202 of the image processing system 200 can communicate with the AON camera sensor 216 to send and/or receive operational parameters to/from the AON camera sensor 216. Similarly, in some implementations, the each of the main camera processing subsystems 204 of the image processing system 200 can communicate with a corresponding main camera sensor of the main camera sensors 218 to send and/or receive operational parameters to/from the corresponding main camera sensor of the main camera sensors 218. The DRAM subsystem 212 of the image processing system 200 can communicate with DRAM 214 over a data bus 215. For example, the DRAM subsystem 212 can send images to and/or retrieve images from the DRAM 214. In some implementations, the image processing system 200 can include a local SRAM 220.

In some cases, the AON camera sensor 216 can include optimizations for reducing power consumption. In some cases, the AON camera processing subsystem 202 can be configured to store data (e.g., image data) in SRAM 220 located within the image processing system 200. In some cases, storing data in SRAM 220 can conserve power by reducing the power required to drive data and address lines when compared to driving signals over the data bus 215 to communicate with DRAM 214. In some implementations, island voltage rails can be used to power the AON camera sensor 216 and AON camera processing subsystem 202. In some cases, using island rails can conserve power by preventing inactive components of the image processing system 200 from drawing power. In some examples, the AON camera sensor 216 can be clocked with a low power clock source such as one or more ring oscillators. In some implementations, a scene in an image and/or video captured by the AON camera sensor 216 can be associated with a DOF range. As described above, a DOF range can include a near distance of acceptable focus and a far distance of acceptable focus. In one illustrative example, the AON camera sensor 216 can capture images with a lower resolution than the main camera sensor 218. In some cases, capturing lower resolution images with the AON camera sensor 216 can save power by reducing the amount of data (e.g., image pixel data) that needs to be read out from the AON camera sensor 216. In some implementations, the AON camera processing subsystem 202 can perform similar processing steps to the main camera processing subsystem 204 on fewer pixels, resulting in fewer calculations and thereby reducing power consumption.

In some implementations, images captured by the AON camera sensor 216 and the main camera sensor 218 can be processed with different image processing steps. For example, the AON camera processing subsystem 202 can perform fewer and/or different processing steps than some or all of the main camera processing subsystems 204. In some cases, performing fewer and/or different processing operations with the AON camera processing subsystem 202 during AON operation can conserve power.

In another example, the AON camera sensor 216 can capture monochrome images while main camera sensor 218 can capture red, green, blue (RGB) color images. In some cases, reading out and processing monochrome images can consume less power than reading out and processing RGB color images. In some cases, the images captured by the AON camera sensor 216 and the main camera sensor 218 can be based on data captured from different portions of the light spectrum such as visible, ultra-violet (UV), near infrared (NIR), short wave infrared (SWIR), other portions of the light spectrum, or any combination thereof.

As illustrated in FIG. 2, the image processing system 200 can include one or more other sensors 219. In some implementations, the sensors 219 can include one or more inertial measurement units (IMUs), accelerometers, gyroscopes, range sensors, light-based sensors, radio-based sensors, sound-based sensors, audio sensors, or the like. For example, the sensors 219 can include a range sensor that can provide depth information corresponding to pixels in images captured by the AON camera sensor 216 and/or the main camera sensors 218. Other components of the image processing system 200 can also receive data from the sensors 219 such as the camera selection subsystem 205 and/or the CPU 210.

In some cases, the camera selection subsystem 205 can receive inputs from the AON camera processing subsystem 202. In some cases, the camera selection subsystem 205 can receive inputs from the sensors 219 and/or the CPU 210. In some cases, the camera selection subsystem 205 can process a preliminary image obtained from the AON camera processing subsystem 202 to determine a DOF range associated with a scene captured in the preliminary image. In some examples, depth information corresponding to the preliminary image can be obtained from the sensors 219. In some implementations, depth data can be obtained from the AON camera sensor 216. For example, depth information may be determined using phase detection or the like. In some cases, the camera selection subsystem 205 can compare the DOF range associated with the scene captured in the preliminary image with DOF capabilities of the main camera sensors 218.

Figure 4:
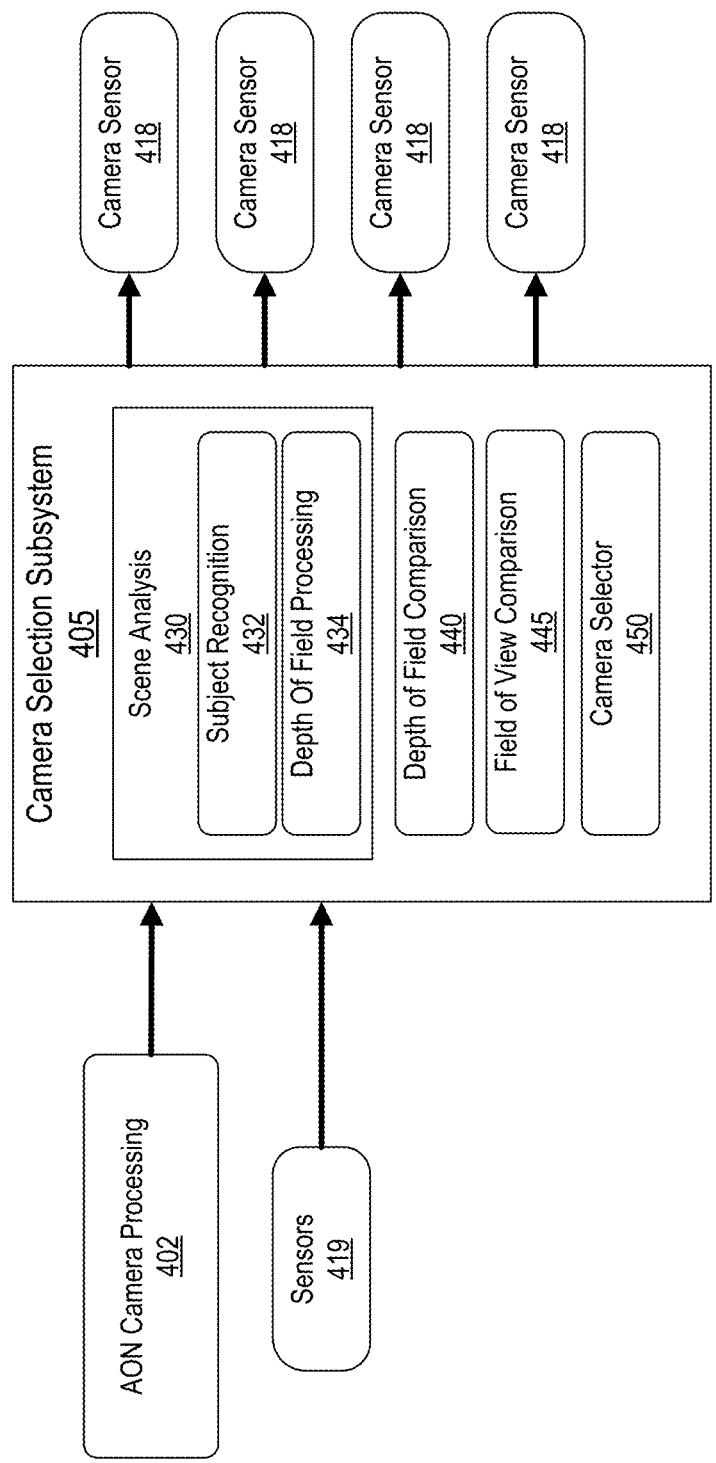
FIG. 4 is a block diagram illustrating an example camera selection subsystem, in accordance with some examples.

Referring to FIG. 4, a block diagram of an example camera selection subsystem 405 is shown. The camera selection subsystem 405 can correspond to camera selection subsystem 205 of FIG. 2. In the illustrated example, the camera selection subsystem 405 includes a scene analysis subsystem 430, a DOF comparison subsystem 440, and a camera selector 450. In some cases, the camera selection subsystem 405 can receive input from an AON camera processing subsystem 402 and sensors 419. In the illustrated example, the AON camera processing subsystem 402 can correspond to the AON camera processing subsystem 202 of FIG. 2. Similarly, the sensors 419 can correspond to the sensors 219 of FIG. 2. In some examples, the camera selection subsystem 405 can provide outputs to control camera sensors 418. In the illustrated example of FIG. 4, the camera sensors 418 can correspond to the main camera sensors 218 of FIG. 2.

In some examples, the scene analysis subsystem 430 can include a subject recognition engine 432 and a DOF processing engine 434. In some implementations, the scene analysis subsystem 430 can be used to determine a DOF range associated with a scene captured in an image received from the AON camera processing subsystem 402. For example, the AON camera processing subsystem 402 can provide an image to the camera selection subsystem 405 while the camera sensors 418 are in an inactive or low power state. In some cases, the image received from the AON camera processing subsystem 402 while camera sensors 418 are inactive can be referred to as a preliminary image.

In some cases, subject recognition engine 432 can include a machine learning engine (not shown) trained to extract features from input images. In some cases, the machine learning engine included in subject recognition engine 432 can generate classifications based on data from the AON camera processing subsystem 402 and/or the sensors 419. In some cases, using the classifications generated by the subject recognition engine 432, the scene analysis subsystem 430 can determine that the preliminary image contains subjects of interest for capture by one of the camera sensors 418. For example, the subject recognition engine 432 may determine that one or more people, pets, objects, scenery, buildings may be subjects of interest. In some cases, the subjects of interest can be determined based on existing images previously captured by a device including the camera selection subsystem 405 of FIG. 4. In some cases, the identified subjects can be provided to the DOF processing engine 434 to determine a DOF range associated with the scene captured in the preliminary image. For example, the DOF range associated with the scene captured in the preliminary image may be determined such that $D_{near}$ of the DOF range associated with the scene is approximately at the location of the nearest subject and $D_{far}$ of the DOF range associated with the scene is approximately at the location of the farthest subject detected by the subject recognition engine 432.

In some implementations, the subject recognition engine 432 can determine a FOV associated with the subjects detected in the preliminary image. For example, the subject recognition engine 432 can determine a FOV associated with the scene sufficient to capture recognized people, friends, pets, objects or the like in a captured image.

In some cases, the DOF processing engine 434 can utilize depth information obtained from the sensors 419 and/or the AON camera processing subsystem 402 to determine the DOF range associated with the scene based on the preliminary image. For example, DOF processing engine 434 can obtain depth values corresponding to pixel locations of detected subjects in the preliminary image. In some cases, the field processing engine 434 can determine the nearest and farthest distance of the pixels corresponding to the detected subjects and determine the DOF range associated with the scene based on the determined nearest and farthest distances.

In some cases, the DOF comparison subsystem 440 can compare the DOF range associated with the scene with DOF ranges (e.g., DOF capabilities) for each of the camera sensors 418. In some cases, the DOF comparison subsystem 440 can determine which of the camera sensors 418 can provide a DOF range that includes the DOF range associated with the scene. In some cases, if only one of the camera sensors 418 can provide a DOF range that includes the DOF range associated with the scene, the camera selector 450 can select the relevant camera sensor 418. In some cases, two or more of the camera sensors 418 may be capable of providing acceptable focus for the DOF range associated with the scene. In some examples, the DOF comparison subsystem 440 can provide a numerical correspondence between the DOF range associated with the scene and DOF ranges provided by each of the camera sensors 418. In some cases, the DOF comparison subsystem 440 can determine one or more of the camera sensors 418 that can provide a DOF range that includes the DOF range associated with the scene. In some cases, the numerical correspondence can include a certain percentage value, ratio, proportion, function, or relation. In one illustrative example, the numerical correspondence can be determined as a DOF score based on Equation (4) below:

$$DOF_{score} = \frac{DOF_{scene}}{DOF_{sensor}} \quad (4)$$

Where $DOF_{score}$ is the DOF score, $DOF_{scene}$ is the DOF (e.g., measured in meters) associated with the scene, and $DOF_{sensor}$ is a DOF range that can be provided by a particular camera sensor of the camera sensors 418. In some implementations, a DOF score can be calculated for each DOF range that can be provided by each camera sensor of the camera sensors 418.

In some cases, the DOF comparison subsystem 440 may calculate a single numerical correspondence for a particular camera sensor of the camera sensors 418. In some cases, the DOF comparison subsystem 440 may calculate multiple numerical correspondences for a particular camera sensor of the camera sensors 418. For example, if a camera sensor includes a variable aperture and/or movable lens elements, the camera sensor may be able to provide multiple DOF ranges.

In some cases, FOV comparison subsystem 445 can compare the FOV associated with the scene determined by scene analysis subsystem 430 with FOV capabilities of each of the camera sensors 418. In some examples, the FOV comparison subsystem 445 can provide a numerical correspondence between the FOV associated with the scene and FOV provided by each of the camera sensors 418 can determine one or more of the camera sensors 418 that can provide a FOV range that includes the FOV range associated with the scene. In some cases, the numerical correspondence can include a certain percentage value, ratio, proportion, function, or relation. In one illustrative example, the numerical correspondence can be determined as a FOV score based on Equation (5) below:

$$FOV_{score} = \frac{FOV_{scene}}{FOV_{sensor}} \quad (5)$$

Where $FOV_{score}$ is the FOV score, $FOV_{scene}$ is the FOV associated with the scene, and $FOV_{sensor}$ is a FOV range that can be provided by a particular camera sensor of the camera sensors 418. In some implementations, a FOV score can be calculated for each FOV range that can be provided by each camera sensor of the camera sensors 418.

In some implementations, the camera selector 450 can select the camera sensor of the camera sensors 418 with the highest $DOF_{score}$ as the camera sensor to activate to capture an image of the scene. In some implementations, the camera selector 450 can select the camera sensor of the camera sensors 418 with the highest $FOV_{score}$ to activate to capture an image of the scene. In some implementations, the camera selector 450 can select a camera sensor of the camera sensors 418 to activate based on combination of $DOF_{score}$ and $FOV_{score}$. In some cases, the camera selection subsystem 405 can reduce power consumed by an electronic device by selecting a camera sensor 418 based on a preliminary image from a single sensor (e.g., an AON sensor), rather than activating each of the camera sensors 418 to capture a preliminary image and determining which camera sensor of the camera sensors 418 to select based on a comparison of the captured preliminary images.

Figure 9:
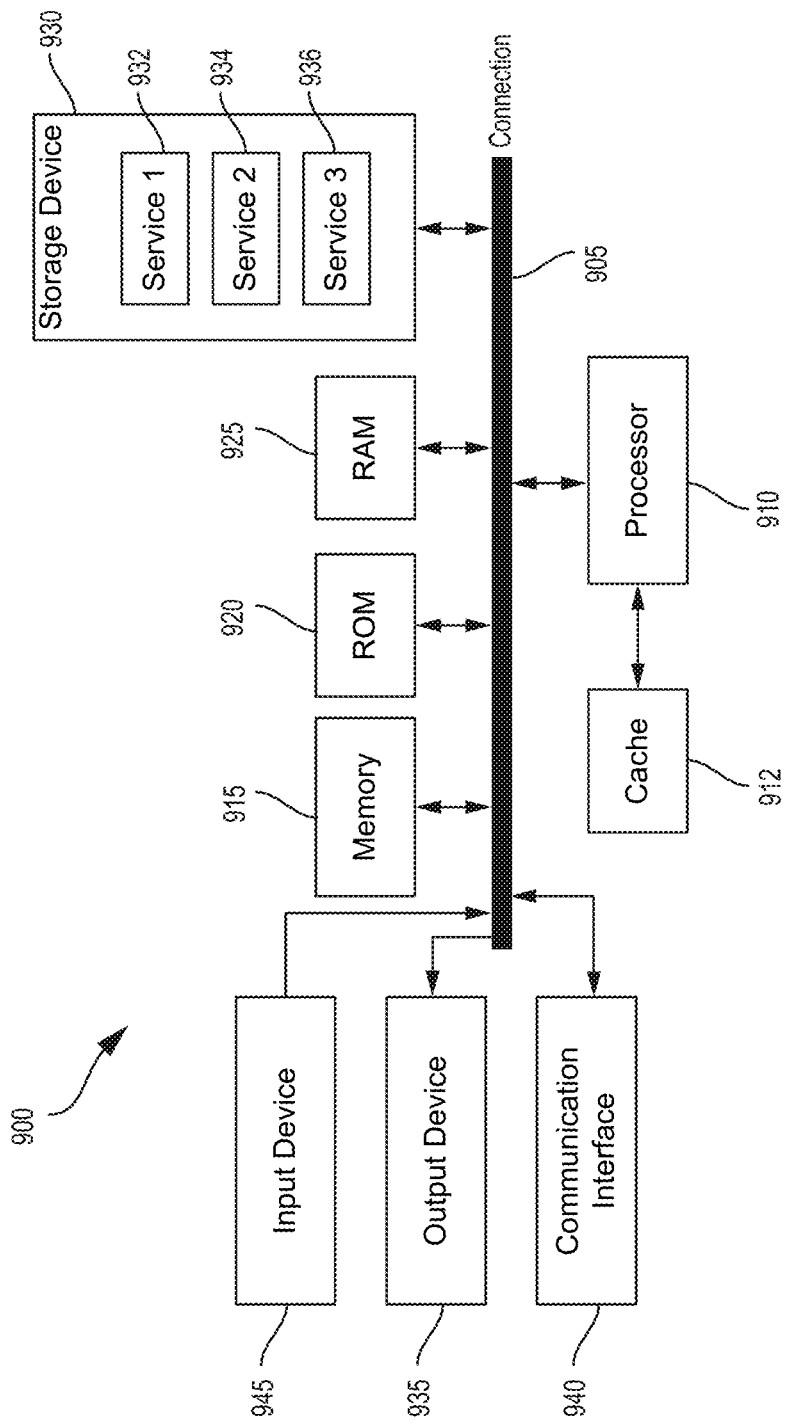
FIG. 9 is a diagram illustrating an example of a computing system for implementing certain aspects described herein.

Returning to FIG. 2, in some aspects, DOF ranges for each of the main camera sensors 218 can be stored in memory (e.g., DRAM 214, SRAM 220, system memory 915 or cache 912 of FIG. 9, or any other suitable memory). In some cases, one or more camera sensors of the main camera sensors 218 may have a single associated DOF range. For example, for camera sensors with a fixed aperture and fixed lens(es), there may only be a single associated DOF range.

In the illustration of FIG. 2, the AON camera sensor 216 and the main camera sensors 218 can each provide images to a different camera processing subsystem in a one-to-one (1:1) relationship. However, in some cases, a single camera processing subsystem can process images (or frames) from multiple camera sensors including the AON camera sensor 216 and/or one or more of the main camera sensors 218 without departing from the scope of the present disclosure. Furthermore, although the AON camera sensor 216 and the main camera sensors 218 are shown as different sensors, one or more camera sensors that can operate in two or more different modes (e.g., an AON mode, a medium power mode, a high power mode, or the like) can also be used without departing from the scope of the present disclosure.

Figure 5:
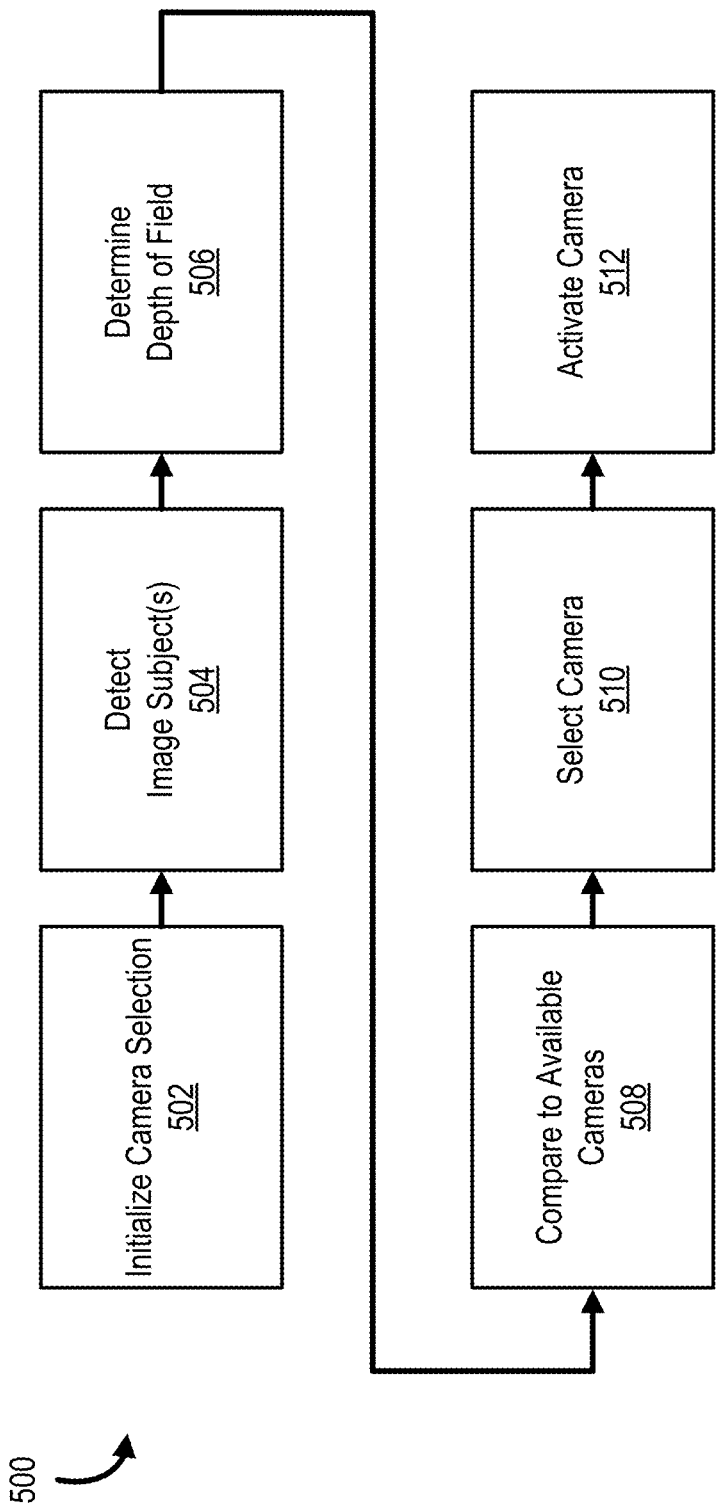
FIG. 5 is a flow diagram illustrating an example of a process for selecting a camera from a plurality of available cameras, in accordance with some examples.

FIG. 5 is a flow diagram illustrating an example of a process 500 for selecting a camera sensor from multiple available camera sensors. At block 502, the process 500 includes initializing a camera sensor selection operation. In some implementations, the process 500 can utilize information from one or more sensors (e.g., AON camera sensor 216 and/or sensors 219 of FIG. 2, or the like) to automatically determine that a user is likely to initiate an image capture. In one illustrative example, one or more motion sensors (e.g., sensors 219 of FIG. 2) can detect movement of a device including the multiple cameras into an image capture position. For example, the process 500 can detect whether the device moved approximately one foot in distance indicating that the device has been positioned an image capture position (e.g., from a table and/or a user's pocket to a position in front of the user's face). In some cases, images from a user facing image sensor can be used to determine whether a user is gazing toward a scene. In another illustrative example, the process 500 can initialize the camera sensor selection operation in response to selection of a camera application by a user of an electronic device. Any other suitable technique for determining that a user is likely to capture an image can also be used without departing from the scope of the present disclosure. In some cases, the process 500 can initialize the camera selection process by obtaining a preliminary image from a camera sensor that is active while other available camera sensors are inactive (e.g., AON camera sensor 216 of FIG. 2).

At block 504, the process 500 can detect image subjects based on the preliminary image. For example, the process 500 can perform feature detection based with a machine learning engine (e.g., included in subject recognition engine 432 of FIG. 4). In some cases, the process 500 can detect subjects (e.g., one or more people, pets, objects, buildings, scenery, or the like) in the preliminary image. In some cases, the process 500 can compare the detected subjects to previously photographed subjects. For example, the detected subjects may be matched to subjects detected in previously captured images stored in a photo gallery of an electronic device.

At block 506, the process 500 can determine a DOF range associated with a scene captured in the preliminary image. For example, the process 500 can determine a nearest subject and a farthest subject in the scene. In some cases, the DOF range associated with the scene can use the distance to the nearest subject as $D_{near}$. In some cases, the DOF range associated with the scene can use the distance to the farthest subject as $D_{far}$. In some implementations, the process 500 can include expand the DOF range (e.g., by 5%, 10%, or any other amount) to account for error in the depth estimation and/or potential movement of the subjects.

At block 508, the process 500 can compare the DOF range associated with the scene captured in the preliminary image to DOF ranges that each camera of the multiple available cameras (e.g., camera sensors 418 of FIG. 4) is capable of providing. In some cases, the available DOF ranges for each of the multiple available cameras can be stored in a memory (e.g., SRAM 220, DRAM 214 of FIG. 2, system memory 915, cache 912, and/or storage device 930 of FIG. 9). In some cases, the process 500 can determine a numerical correspondence between the DOF range associated with the scene and each of the DOF ranges that can be provided by the multiple available camera sensors. In one illustrative example, the numerical correspondence can be determined as a DOF score as shown in Equation (4).

At block 510, the process 500 can select the camera sensor of the multiple available camera sensors that provides a DOF range that is a best fit to the DOF range associated with the scene (e.g., the camera and DOF range with the highest DOF score). In some cases, the process 500 can also select the specific DOF range from multiple DOF ranges available from the selected camera sensor (e.g., for a camera sensor with variable aperture, lens position, or the like).

At block 512, the process 500 can activate the selected camera and capture an image of the scene. For example, the selected camera can be activated when process 500 obtains a user input for capturing an image. In one illustrative example, the process 500 can activate the selected camera when a user taps a portion of a display that includes a detected subject. In some cases, the activated camera can be used to capture an image (or video) of a scene when a user pressed a capture and/or record button.

As noted above, the image processing system 200, the camera selection subsystem 405, and related techniques herein can allow a system to automatically and efficiently select a camera (or camera sensor) from multiple available cameras (e.g., main camera sensors 218 of FIG. 2) for capturing a scene. For example, using a preliminary image captured by an AON camera sensor (e.g., AON camera sensor 216 of FIG. 2), the systems and techniques can determine a DOF range and/or a FOV associated with a scene captured in the preliminary image. In some cases, the camera selection subsystem 405 can compare DOF ranges that each of the multiple cameras is capable of providing against the determined DOF range associated with the scene. In some implementations, the camera selection subsystem 405 can compare the FOV associated with FOV capabilities of each of the multiple cameras.

By determining which of the available cameras to select based on a preliminary image, the system and techniques described herein can avoid turning on each camera of the multiple cameras to capture an image and determine which of the multiple cameras provides a best image quality. As the number of cameras available in electronic devices increases, the total power savings provided by the systems and techniques can also increase. In one illustrative example, activating a camera to capture a preliminary image can consume 200 milliwatt (mW) of power. For an electronic device including five cameras, a total of 1 W of power can be consumed as a result. In some examples, using the systems and techniques described herein, an AON camera operating on in a low power mode can determine which of the available cameras to select based on a preliminary image using between 20 and 30 mW of power.

Figure 6:
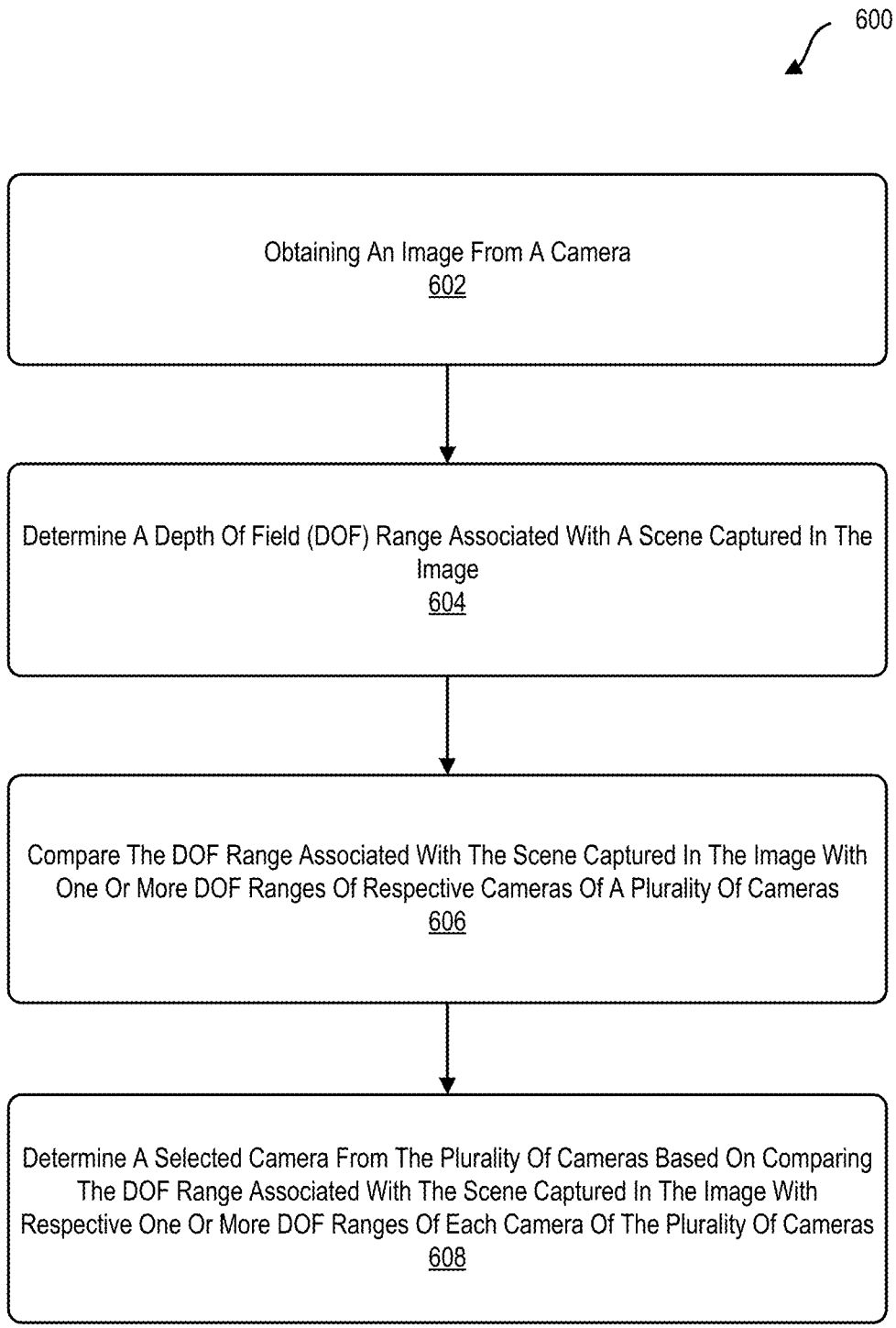
FIG. 6 is a flow diagram illustrating an example of a process for selecting a camera from a plurality of available cameras, in accordance with some examples.

FIG. 6 is a flow diagram illustrating an example of a process 600 of selecting a camera from multiple available cameras. At block 602, the process 600 includes obtaining an image from a camera (e.g., AON camera sensor 216, main camera sensors 218).

At block 604, the process 600 includes determining a DOF range associated with a scene captured in the image (e.g., by scene analysis subsystem 430 of FIG. 4). In some aspects, the DOF range associated with the scene comprises a near distance associated with the scene and a far distance associated with the scene.

At block 606, the process 600 includes comparing the DOF range associated with the scene captured in the image with one or more DOF ranges of respective cameras of a plurality of cameras (e.g., by DOF comparison subsystem 440). In some examples, determining the DOF range associated with the scene captured in the image includes determining a near distance associated with the scene based on the image and determining a far distance associated with the scene based on the image. In some cases, the DOF range associated with the scene is determined at least in part based upon detecting, based on the image, one or more recognized people, friends, pets, or objects.

At block 608, the process 600 includes determining a selected camera from the plurality of cameras based on comparing the DOF range associated with the scene captured in the image with respective one or more DOF ranges of each camera of the plurality of cameras. In some aspects, the process 600 includes capturing an additional image by the selected camera. In some implementations, the selected camera comprises the camera from which the image was obtained. In some cases, the selected camera comprises a second camera, different from the camera. In some implementations, the plurality of cameras excludes the camera from which the image was obtained.

In some examples, the process 600 includes detecting a first subject in the scene captured in the image. In some cases, determining the DOF range associated with the scene captured in the image comprises determining at least one of a near distance associated with the first subject and a far distance associated with the first subject. In some cases, the process 600 includes detecting a second subject in the scene captured in the image. In some examples, determining the DOF range associated with the scene captured in the image comprises determining the near distance associated with the first subject and a far distance associated with the second subject.

In some cases, a first camera of the plurality of cameras includes a variable aperture having at least a first aperture size and a second aperture size. In some examples, a first DOF range of the first camera is associated with the first aperture size and a second DOF range, different from the first DOF range, is associated with the second aperture size. For example, in some cases, a first camera of the plurality of cameras is associated with a first DOF range and a second DOF range, different from the first DOF range. In some examples, the first DOF range is associated with a first aperture size and the second DOF range is associated with a second aperture size, different from the first aperture size.

In some implementations, a first DOF range associated with a first camera of the plurality of cameras comprises a first near distance and a first far distance. In some examples, a second DOF range associated with a second camera of the plurality of cameras comprises a second near distance and a second far distance. In some cases, the DOF range associated with the scene at least partially overlaps with both the first DOF range and the second DOF range.

In some examples, the processes described herein (e.g., process 500, process 600, and/or other process described herein) may be performed by a computing device or apparatus. In one example, one or more of the processes can be performed by the image processing system 200 of FIG. 2. In another example, one or more of the processes can be performed by the computing system 900 shown in FIG. 9. For instance, a computing device with the computing system 900 shown in FIG. 9 can include the components of the camera selection system, or any combination thereof and can implement the operations of the process 500 of FIG. 5, process 600 of FIG. 6, and/or other processes described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the processes 500, 600, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 500 and 600 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 500, 600, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
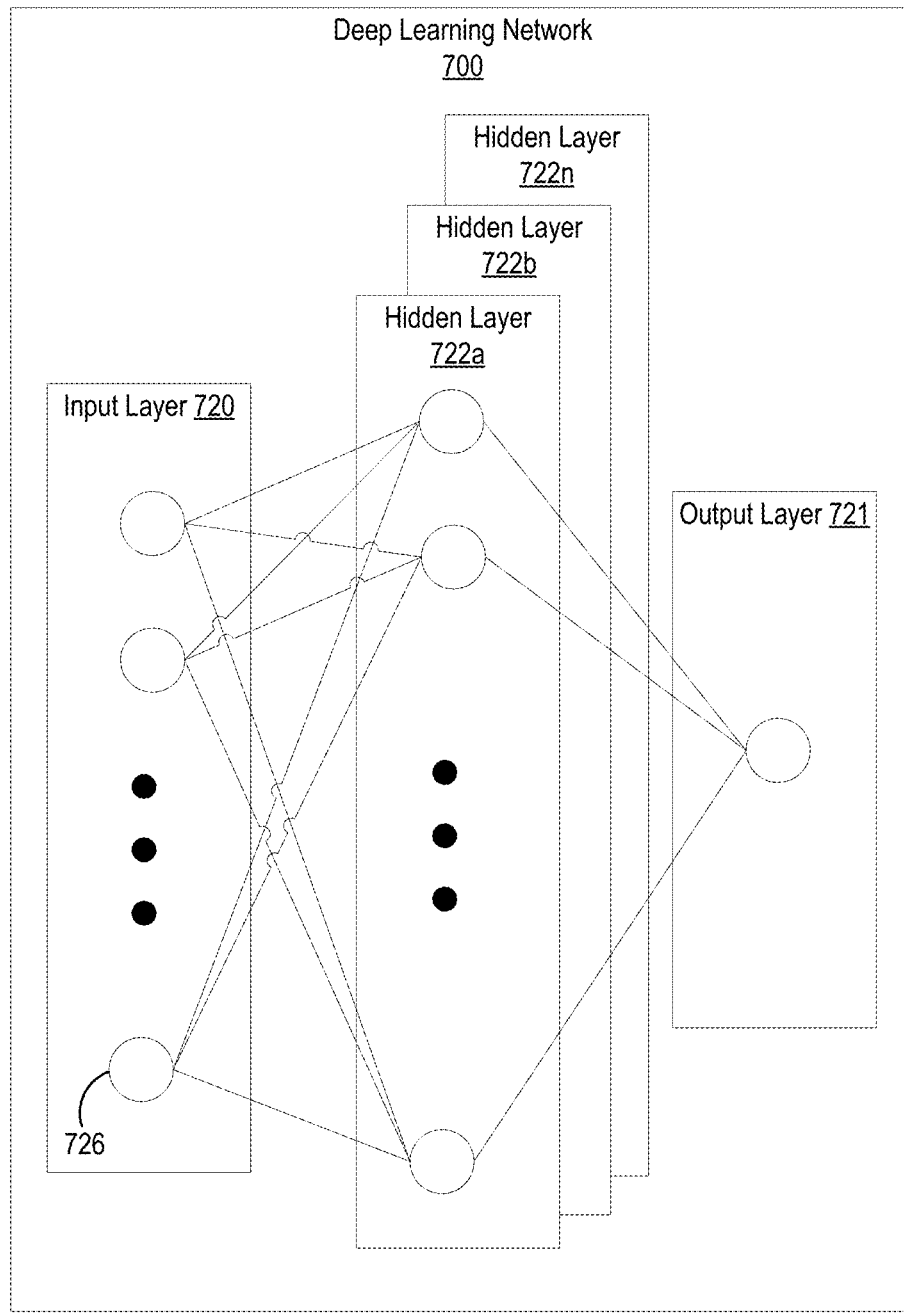
FIG. 7 is a block diagram illustrating an example of a deep learning network, in accordance with some examples.

As noted above, various aspects of the present disclosure can use machine learning models or systems. FIG. 7 is an illustrative example of a deep learning neural network 700 that can be used to implement machine learning based feature extraction. In one illustrative example, feature extraction can be used to detect subjects in a scene captured in a preliminary image. An input layer 720 includes input data. In one illustrative example, the input layer 720 can include data representing the pixels of an input image. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 721 that provides an output resulting from the processing performed by the hidden layers 722a, 722b, through 722n. In one illustrative example, the output layer 721 can provide a classification for an object in an input image. The classification can include a class identifying the type of subject (e.g., person, friend, pet, object, building, scenery, etc.).

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721. In an example in which the neural network 700 is used to identify subjects in a preliminary image, the neural network 700 can be trained using training data that includes both images and labels, as described above. For instance, training images can be input into the network, with each training image having a label indicating the features in the images. In one example using object classification for illustrative purposes, a training image can include an image of a number 2, in which case the label for the image can be [0 0 1 0 0 0 0 0 0 0].

In some cases, the neural network 700 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of identifying objects (or subjects) in images, the forward pass can include passing a training image through the neural network 700. The weights are initially randomized before the neural network 700 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 700 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 700 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

Figure 8:
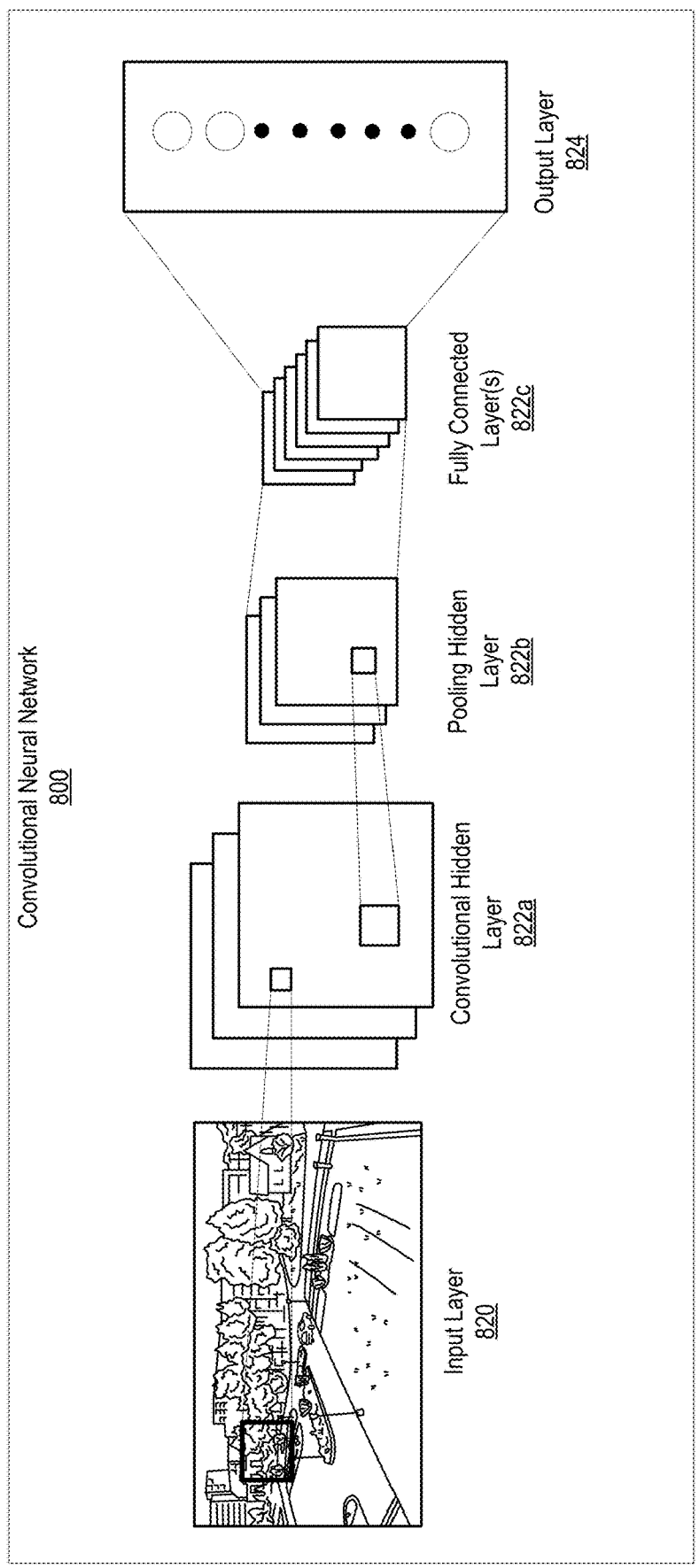
FIG. 8 is a block diagram illustrating an example of a convolutional neural network, in accordance with some examples.

FIG. 8 is an illustrative example of a convolutional neural network (CNN) 800. The input layer 820 of the CNN 800 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (numbers) and the same depth as the input. A filter will have a depth of 3 for the image example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822b can take each activation map output from the convolutional hidden layer 822a and generates a condensed activation map (or feature map) using a pooling function. Max-pooling is one example of a function performed by a pooling hidden layer. Other forms of pooling functions be used by the pooling hidden layer 822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 822a. In the example shown in FIG. 8, three pooling filters are used for the three activation maps in the convolutional hidden layer 822a.

In some examples, max-pooling can be used by applying a max-pooling filter (e.g., having a size of 2×2) with a stride (e.g., equal to a dimension of the filter, such as a stride of 2) to an activation map output from the convolutional hidden layer 822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822a having a dimension of 24×24 nodes, the output from the pooling hidden layer 822b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 822b to every one of the output nodes in the output layer 824. Using the example above, the input layer includes 28×28 nodes encoding the pixel intensities of the input image, the convolutional hidden layer 822a includes 3×24×24 hidden feature nodes based on application of a 5×5 local receptive field (for the filters) to three activation maps, and the pooling hidden layer 822b includes a layer of 3×12×12 hidden feature nodes based on application of max-pooling filter to 2×2 regions across each of the three feature maps. Extending this example, the output layer 824 can include ten output nodes. In such an example, every node of the 3×12×12 pooling hidden layer 822b is connected to every node of the output layer 824.

The fully connected layer 822c can obtain the output of the previous pooling hidden layer 822b (which should represent the activation maps of high-level features) and determines the features that most correlate to a particular class. For example, the fully connected layer 822c layer can determine the high-level features that most strongly correlate to a particular class, and can include weights (nodes) for the high-level features. A product can be computed between the weights of the fully connected layer 822c and the pooling hidden layer 822b to obtain probabilities for the different classes. For example, if the CNN 800 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10). M indicates the number of classes that the CNN 800 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc.

Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials.

The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for selecting a camera from a plurality of cameras, comprising: obtaining an image from a camera; determining a depth of field (DOF) range associated with a scene captured in the image; comparing the DOF range associated with the scene captured in the image with one or more DOF ranges of respective cameras of a plurality of cameras; and determining a selected camera from the plurality of cameras based on comparing the DOF range associated with the scene captured in first image with respective one or more DOF ranges of each camera of the plurality of cameras.

Aspect 2. The method of Aspect 1, further comprising capturing an additional image by the selected camera.

Aspect 3. The method of any of Aspects 1 to 2, further comprising: determining that a user intends to capture an image based on the first image captured by the camera, wherein the camera is active while the selected camera of the plurality of cameras is inactive.

Aspect 4. The method of any of Aspects 1 to 3 further comprising: displaying the additional image on a display; obtaining, subsequent to displaying the additional image on the display, an additional DOF range, different from the DOF range associated with the scene; from the plurality of cameras based on comparing the additional DOF range with the one or more DOF ranges of respective cameras of the plurality of cameras; and capturing a third image by the additional selected camera.

Aspect 5. The method of any of Aspects 1 to 4, wherein the additional DOF range is obtained based on a user input.

Aspect 6. The method of any of Aspects 1 to 5, wherein the DOF range associated with the scene comprises a near distance associated with the scene and a far distance associated with the scene.

Aspect 7. The method of any of Aspects 1 to 6, further comprising detecting a first subject in the scene captured in the image, wherein determining the DOF range associated with the scene captured in the image comprises determining at least one of a near distance associated with the first subject and a far distance associated with the first subject.

Aspect 8. The method of any of Aspects 1 to 7, further comprising detecting a second subject in the scene captured in the first image, wherein determining the DOF range associated with the scene captured in the first image comprises determining the near distance associated with the first subject and a far distance associated with the second subject.

Aspect 9. The method of any of Aspects 1 to 8, wherein comparing the DOF range associated the scene with the one or more DOF ranges of respective cameras of the plurality of cameras comprises determining a numerical correspondence between the near distance of acceptable focus, the far distance of acceptable focus, and the respective one or more DOF ranges of each camera of the plurality of cameras.

Aspect 10. The method of any of Aspects 1 to 9, wherein determining the DOF range associated with the scene captured in the image comprises: determining a near distance associated with the scene based on the image; and determining a far distance associated with the scene based on the image.

Aspect 11. The method of any of Aspects 1 to 10, wherein the DOF range associated with the scene is determined at least in part based upon detecting, based on the image, one or more recognized people, friends, pets, or objects.

Aspect 12. The method of any of Aspects 1 to 11, wherein a first camera of the plurality of cameras includes a variable aperture having at least a first aperture size and a second aperture size, wherein a first DOF range of the first camera is associated with the first aperture size and a second DOF range, different from the first DOF range, is associated with the second aperture size.

Aspect 13. The method of any of Aspects 1 to 12, wherein a first camera of the plurality of cameras is associated with a first DOF range and a second DOF range, different from the first DOF range.

Aspect 14. The method of any of Aspects 1 to 13, wherein the first DOF range is associated with a first aperture size and the second DOF range is associated with a second aperture size, different from the first aperture size.

Aspect 15. The method of any of Aspects 1 to 14, wherein the selected camera comprises the camera from which the first image was obtained.

Aspect 16. The method of any of Aspects 1 to 15, wherein the selected camera comprises a second camera, different from the camera.

Aspect 17. The method of any of Aspects 1 to 16, wherein the plurality of cameras excludes the camera from which the first image was obtained.

Aspect 18. The method of any of Aspects 1 to 17, wherein: a first DOF range associated with a first camera of the plurality of cameras comprises a first near distance and a first far distance; a second DOF range associated with a second camera of the plurality of cameras comprises a second near distance and a second far distance; and the DOF range associated with the scene at least partially overlaps with both the first DOF range and the second DOF range.

Aspect 19. The method of any of Aspects 1 to 18, wherein the DOF range associated with the scene captured in the image is determined in response to determining that a user intends to capture an image.

Aspect 20. The method of any of Aspects 1 to 19, wherein comparing the DOF range associated with the scene with the respective one or more DOF ranges of each camera of the plurality of cameras comprises determining a numerical correspondence between the DOF range associated with the scene and the respective one or more DOF ranges of each camera of the plurality of cameras.

Aspect 21. The method of any of Aspects 1 to 20, wherein determining the numerical correspondence comprises one or more of a certain percentage value, ratio, proportion, function, or relation.

Aspect 22. The method of any of Aspects 1 to 21 wherein comparing the DOF range associated with the scene with the respective one or more DOF ranges of each camera of the plurality of cameras comprises: determining a first numerical correspondence between the DOF range associated with the scene and a first DOF range associated with a first camera of the plurality of cameras; and determining a second numerical correspondence between the DOF range associated with the scene and a second DOF range associated with the first camera of the plurality of cameras, wherein the second DOF range is different from the first DOF range.

Aspect 23: An apparatus for selecting a camera from a plurality of cameras. The apparatus includes a memory (e.g., implemented in circuitry) and a processor (or multiple processors) coupled to the memory. The processor (or processors) is configured to: obtain an image from a camera; determine a depth of field (DOF) range associated with a scene captured in the image; compare the DOF range associated with the scene captured in the image with one or more DOF ranges of respective cameras of a plurality of cameras; and determine a selected camera from the plurality of cameras based on comparing the DOF range associated with the scene captured in first image with respective one or more DOF ranges of each camera of the plurality of cameras.

Aspect 24: The apparatus of Aspect 23, wherein the processor is configured to: capture an additional image by the selected camera.

Aspect 25: The apparatus of any of Aspects 23 to 24, wherein the processor is configured to: determine that a user intends to capture an image based on the first image captured by the camera, wherein the camera is active while the selected camera of the plurality of cameras is inactive.

Aspect 26: The apparatus of any of Aspects 23 to 25, wherein the processor is configured to: display the additional image on a display; obtaining, subsequent to displaying the additional image on the display, an additional DOF range, different from the DOF range associated with the scene; from the plurality of cameras based on comparing the additional DOF range with the one or more DOF ranges of respective cameras of the plurality of cameras; and capture a third image by the additional selected camera.

Aspect 27: The apparatus of any of Aspects 23 to 26, wherein the additional DOF range is obtained based on a user input.

Aspect 28: The apparatus of any of Aspects 23 to 27, wherein the DOF range associated with the scene comprises a near distance associated with the scene and a far distance associated with the scene.

Aspect 29: The apparatus of any of Aspects 23 to 28, wherein the processor is configured to: detect a first subject in the scene captured in the image, wherein determining the DOF range associated with the scene captured in the image comprises determining at least one of a near distance associated with the first subject and a far distance associated with the first subject.

Aspect 30: The apparatus of any of Aspects 23 to 29, wherein the processor is configured to: detect a second subject in the scene captured in the first image, wherein determining the DOF range associated with the scene captured in the first image comprises determining the near distance associated with the first subject and a far distance associated with the second subject.

Aspect 31: The apparatus of any of Aspects 23 to 30, wherein comparing the DOF range associated the scene with the one or more DOF ranges of respective cameras of the plurality of cameras comprises determining a numerical correspondence between the near distance of acceptable focus, the far distance of acceptable focus, and the respective one or more DOF ranges of each camera of the plurality of cameras.

Aspect 32: The apparatus of any of Aspects 23 to 31, wherein the processor is configured to: determine a near distance associated with the scene based on the image; and determine a far distance associated with the scene based on the image.

Aspect 33: The apparatus of any of Aspects 23 to 32, wherein the DOF range associated with the scene is determined at least in part based upon detecting, based on the image, one or more recognized people, friends, pets, or objects.

Aspect 34: The apparatus of any of Aspects 23 to 33, wherein a first camera of the plurality of cameras includes a variable aperture having at least a first aperture size and a second aperture size, wherein a first DOF range of the first camera is associated with the first aperture size and a second DOF range, different from the first DOF range, is associated with the second aperture size.

Aspect 35: The apparatus of any of Aspects 23 to 34, wherein a first camera of the plurality of cameras is associated with a first DOF range and a second DOF range, different from the first DOF range.

Aspect 36: The apparatus of any of Aspects 23 to 35, wherein the first DOF range is associated with a first aperture size and the second DOF range is associated with a second aperture size, different from the first aperture size.

Aspect 37: The apparatus of any of Aspects 23 to 36, wherein the selected camera comprises the camera from which the first image was obtained.

Aspect 38: The apparatus of any of Aspects 23 to 37, wherein the selected camera comprises a second camera, different from the camera.

Aspect 39: The apparatus of any of Aspects 23 to 38, wherein the plurality of cameras excludes the camera from which the first image was obtained.

Aspect 40: The apparatus of any of Aspects 23 to 39, wherein a first DOF range associated with a first camera of the plurality of cameras comprises a first near distance and a first far distance; a second DOF range associated with a second camera of the plurality of cameras comprises a second near distance and a second far distance; and the DOF range associated with the scene at least partially overlaps with both the first DOF range and the second DOF range.

Aspect 41: The apparatus of any of Aspects 23 to 40, wherein the DOF range associated with the scene captured in the image is determined in response to determining that a user intends to capture an image.

Aspect 42: The apparatus of any of Aspects 23 to 41, wherein comparing the DOF range associated with the scene with the respective one or more DOF ranges of each camera of the plurality of cameras comprises determining a numerical correspondence between the DOF range associated with the scene and the respective one or more DOF ranges of each camera of the plurality of cameras.

Aspect 43: The apparatus of any of Aspects 23 to 42, wherein determining the numerical correspondence comprises one or more of a certain percentage value, ratio, proportion, function, or relation.

Aspect 44: The apparatus of any of Aspects 23 to 43, wherein the processor is configured to: determine a first numerical correspondence between the DOF range associated with the scene and a first DOF range associated with a first camera of the plurality of cameras; and determine a second numerical correspondence between the DOF range associated with the scene and a second DOF range associated with the first camera of the plurality of cameras, wherein the second DOF range is different from the first DOF range.

Aspect 45: A non-transitory computer-readable storage medium having stored thereon instructions which, when executed by one or more processors, cause the one or more processors to perform any of the operations of aspects 1 to 44.

Aspect 46: An apparatus comprising means for performing any of the operations of aspects 1 to 44.

What is claimed is:

1. A method for selecting a camera from a plurality of cameras, comprising:
   determining a first depth of field (DOF) range associated with a scene;
   comparing the DOF range associated with the scene with one or more DOF ranges of respective cameras of a plurality of cameras;
   selecting a first camera from the plurality of cameras based on comparing the DOF range associated with the scene with respective one or more DOF ranges of each camera of the plurality of cameras;
   receiving a first image from the first camera;
   selecting a second camera from the plurality of cameras based on comparing a selected DOF range with the one or more DOF ranges of respective cameras of the plurality of cameras, wherein the second DOF range is different from the first DOF range; and
   receiving a second image from the second camera.

2. The method of claim 1, further comprising:
   displaying the second image on a display.

3. The method of claim 2, wherein the second DOF range is obtained based on a user input.

4. The method of claim 1, wherein the first DOF range associated with the scene comprises a near distance associated with the scene and a far distance associated with the scene.

5. The method of claim 4, further comprising detecting a first subject in the scene, wherein determining the first DOF range associated with the scene comprises determining at least one of a near distance associated with the first subject and a far distance associated with the first subject.

6. The method of claim 5, further comprising detecting a second subject in the scene, wherein determining the first DOF range associated with the scene comprises determining the near distance associated with the first subject and a far distance associated with the second subject.

7. The method of claim 1, wherein determining the first DOF range associated with the scene comprises:
   determining a near distance associated with the scene based on an image received from at least one camera of the plurality of cameras; and
   determining a far distance associated with the scene based on the image received from at least one camera of the plurality of cameras.

8. The method of claim 1, wherein the first DOF range associated with the scene is determined at least in part based upon detecting, based on an image received from at least one camera of the plurality of cameras, one or more recognized people, friends, pets, or objects.

9. The method of claim 1, wherein first camera of the plurality of cameras includes a variable aperture configured to be adjusted between at least a first aperture size and a second aperture size, wherein the first DOF range is associated with the first aperture size and the second DOF range, is associated with the second aperture size.

10. The method of claim 1, wherein a first camera of the plurality of cameras is associated with the first DOF range and the second DOF range.

11. The method of claim 10, wherein the first DOF range is associated with a first aperture size and the second DOF range is associated with a second aperture size, different from the first aperture size.

12. The method of claim 1, wherein the first DOF range is determined based on an image obtained from at least one camera of the plurality of cameras and wherein the first camera comprises the camera from which the image was obtained.

13. The method of claim 12, wherein the plurality of cameras excludes the camera from which the image was obtained.

14. The method of claim 1, wherein:
   a third DOF range associated with the first camera of the plurality of cameras comprises a first near distance and a first far distance;
   a fourth DOF range associated with the second camera of the plurality of cameras comprises a second near distance and a second far distance; and
   the first DOF range at least partially overlaps with both the third DOF range and the fourth DOF range.

15. An apparatus for selecting a camera from a plurality of cameras, comprising:
   at least one memory; and
   at least one processor coupled to at least one memory and configured to:
      determine a first depth of field (DOF) range associated with a scene;
      compare the DOF range associated with the scene with one or more DOF ranges of respective cameras of a plurality of cameras;
      select a first camera from the plurality of cameras based on comparing the DOF range associated with the scene with respective one or more DOF ranges of each camera of the plurality of cameras;
      receive a first image from the first camera;
      select a second camera from the plurality of cameras based on comparing a selected DOF range with the one or more DOF ranges of respective cameras of the plurality of cameras, wherein the second DOF range is different from the first DOF range; and
      receive a second image from the second camera.

16. The apparatus of claim 15, wherein the first DOF range associated with the scene comprises a near distance associated with the scene and a far distance associated with the scene.

17. The apparatus of claim 16, wherein the at least one processor is configured to: detect a first subject in the scene, wherein determining the first DOF range associated with the scene comprises determining at least one of a near distance associated with the first subject and a far distance associated with the first subject.

18. The apparatus of claim 17, wherein the at least one processor is configured to: detect a second subject in the scene, wherein determining the first DOF range associated with the scene comprises determining the near distance associated with the first subject and a far distance associated with the second subject.

19. The apparatus of claim 15, wherein the at least one processor is configured to:
   determine a near distance associated with the scene based on an image received from at least one camera of the plurality of cameras; and
   determine a far distance associated with the scene based on the image received from at least one camera of the plurality of cameras.

20. The apparatus of claim 15, wherein the first DOF range associated with the scene is determined at least in part based upon detecting, based on an image received from at least one camera of the plurality of cameras, one or more recognized people, friends, pets, or objects.

21. The apparatus of claim 15, wherein first camera of the plurality of cameras includes a variable aperture configured to be adjusted between at least a first aperture size and a second aperture size, wherein the first DOF range is associated with the first aperture size and the second DOF range, is associated with the second aperture size.

22. The apparatus of claim 15, wherein a first camera of the plurality of cameras is associated with the first DOF range and the second DOF range.

23. The apparatus of claim 22, wherein the first DOF range is associated with a first aperture size and the second DOF range is associated with a second aperture size, different from the first aperture size.

24. The apparatus of claim 15, wherein the first DOF range is determined based on an image obtained from at least one camera of the plurality of cameras and wherein the first camera comprises the camera from which the image was obtained.

25. The apparatus of claim 24, wherein the plurality of cameras excludes the camera from which the first image was obtained.

26. The apparatus of claim 15, wherein:
   a third DOF range associated with the first camera of the plurality of cameras comprises a first near distance and a first far distance;
   a fourth DOF range associated with the second camera of the plurality of cameras comprises a second near distance and a second far distance; and
   the first DOF range at least partially overlaps with both the first third DOF range and the fourth DOF range.

* * * * *